US011352292B2

(12) United States Patent
Kraut et al.

(10) Patent No.: US 11,352,292 B2
(45) Date of Patent: Jun. 7, 2022

(54) METHOD FOR PREPARING OPTICAL ARTICLES WITH MULTI-LAYER ANTIREFLECTIVE COATINGS

(71) Applicant: PPG Industries Ohio, Inc., Cleveland, OH (US)

(72) Inventors: Nadine Kraut, Glenshaw, PA (US); Kevin Sylvester, Lawrence, PA (US); Nathan Silvernail, Mars, PA (US); Brian C. Okerberg, Gibsonia, PA (US); Charles R. Hickenboth, Zelienople, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 120 days.

(21) Appl. No.: 16/262,118

(22) Filed: Jan. 30, 2019

(65) Prior Publication Data
US 2020/0240032 A1 Jul. 30, 2020

(51) Int. Cl.
*C23C 28/00* (2006.01)
*C25D 13/02* (2006.01)
(Continued)

(52) U.S. Cl.
CPC .......... *C03C 17/3417* (2013.01); *C03C 17/25* (2013.01); *C25D 5/10* (2013.01);
(Continued)

(58) Field of Classification Search
CPC .. C23C 28/00; C25D 5/54; C25D 5/56; C25D 13/00; C25D 13/02; C25D 13/04; C25D 7/08; C25D 9/04; C25D 9/08
(Continued)

(56) References Cited

U.S. PATENT DOCUMENTS 5,856,018 A * 1/1999 Chen ...................... G02B 1/115
428/448
6,180,310 B1 * 1/2001 Pinsly ....................... B05C 3/09
427/430.1
(Continued)

FOREIGN PATENT DOCUMENTS

EP 1144486 B1 10/2001
EP 2804026 A1 11/2014
(Continued)

OTHER PUBLICATIONS

Giordano et al., "Multilayer Deposition of Silica Sol-Gel films by Electrochemical Assisted Techniques," The Journal of Physical Chemistry C. (Dec. 2, 20162), vol. 120, No. 50, p. 28820-28824. (Year: 2016).*
(Continued)

*Primary Examiner* — Edna Wong
(74) *Attorney, Agent, or Firm* — Nina A. Reger

(57) ABSTRACT

The present invention is directed to a method for preparing a coated optical article including providing a non-conductive substrate; forming a conductive coating layer over the substrate; electrodepositing a first electrodepositable coating composition over the conductive coating layer to form a first electrodeposited inorganic coating layer; and electrodepositing a second electrodepositable coating composition over the first electrodeposited coating layer to form a second electrodeposited inorganic coating layer thereover, thereby forming a multi-layer antireflective inorganic coating over the conductive coating layer. Each of the first electrodepositable coating composition and the second electrodepositable coating composition is different one from the other, and each includes a sol prepared from a composition of a metal oxide precursor and protic acid such that each coating
(Continued)

composition is hydrolyzed. Coated optical articles are also provided.

19 Claims, 1 Drawing Sheet

(51) Int. Cl.
| | |
|---|---|
| C03C 17/34 | (2006.01) |
| C03C 17/25 | (2006.01) |
| C25D 5/10 | (2006.01) |
| C25D 5/54 | (2006.01) |
| G02B 1/116 | (2015.01) |
| C25D 7/08 | (2006.01) |
| C25D 9/04 | (2006.01) |
| C25D 5/00 | (2006.01) |

(52) U.S. Cl.
CPC .............. *C25D 5/54* (2013.01); *C25D 5/627* (2020.08); *C25D 7/08* (2013.01); *C25D 9/04* (2013.01); *C25D 13/02* (2013.01); *G02B 1/116* (2013.01); *C03C 2217/21* (2013.01); *C03C 2217/213* (2013.01); *C03C 2217/22* (2013.01); *C03C 2217/231* (2013.01); *C03C 2217/734* (2013.01); *C03C 2217/948* (2013.01); *C03C 2218/115* (2013.01)

(58) Field of Classification Search
USPC ........ 205/490, 491; 204/471, 480, 484, 490, 204/491, 508, 509
See application file for complete search history.

(56) References Cited

U.S. PATENT DOCUMENTS

| | | | | |
|---|---|---|---|---|
| 6,410,173 | B1* | 6/2002 | Arfsten | ............... C03C 17/3417 351/159.57 |
| 9,556,071 | B2 | 1/2017 | Finley et al. | |
| 2007/0131555 | A1* | 6/2007 | Thon | ...................... C25D 21/12 204/622 |
| 2007/0224404 | A1 | 9/2007 | Finley et al. | |
| 2010/0078328 | A1* | 4/2010 | Mandler | ................... C25D 9/04 205/50 |
| 2014/0166476 | A1* | 6/2014 | Abraham | ................ C25D 17/00 204/237 |
| 2014/0329072 | A1 | 11/2014 | Hirasawa et al. | |
| 2017/0137957 | A1* | 5/2017 | Barwich | ................ C25D 13/22 |
| 2017/0219848 | A1 | 8/2017 | Kraus et al. | |
| 2019/0024671 | A1* | 1/2019 | Harner et al. | ........ B05C 5/0275 |
| 2019/0025469 | A1 | 1/2019 | Bluck et al. | |

FOREIGN PATENT DOCUMENTS

| | | | | |
|---|---|---|---|---|
| JP | 2015176084 | A * | 10/2015 | ........... G03G 15/206 |
| WO | 2005100642 | A1 | 10/2005 | |
| WO | WO-2005100642 | A1 * | 10/2005 | ............... C25D 9/04 |
| WO | 2019018698 | A1 | 1/2019 | |

OTHER PUBLICATIONS

Giordano et al., "SiO2—TiO2 Multilayer via Electrochemical Deposition: Characterization of Reflection and Refractive Index," Journal of Sol-Gel Science and Technology (Jan. 15, 2019), vol. 89, No. 1, pp. 196-204. (Year: 2019).*

Lee et al., "Optical Coatings on Polymethyl Methacrylate and Polycarbonate," Thin Solid Films (Feb. 28, 1997), vol. 295, Nos. 1-2, pp. 122-124. (Year: 1997).*

Saravanan et al., "Fabrication, Characterization of TiO2/SiO2 Multilayers Using Sol-Gel Spin Coating Method," Nanosystems: Physics, Chemistry, Mathematics (2019), vol. 10, No. 1, pp. 63-69. (Year: 2019).*

Wang et al., "Design and Sol-Gel Preparation of SiO2/TiO2 and SiO2/SnO2/SiO2—SnO2 Multilayer Antireflective Coatings," Applied Surface Science (Nov. 15, 2017), vol. 422, pp. 970-974. (Year: 2017).*

Chen, "Review of preparation and optoelectronic characteristics of Cu2O-based solar cells with nanostructure", 2013, Materials Science in Semiconductor Processing, vol. 16, pp. 1172-1185.

Giordano et al., "SiO213 TiO2 multilayer via electrochemical deposition: characterization of reflection and refractive index", Journal of Sol-Gel Science and Technology, 2019, vol. 89, pp. 196-204.

Besra et al., "A review on fundamentals and applications of electrophoretic deposition (EPD)", Progress in Materials Science, 2007, vol. 52, pp. 1-61.

Collinson et al., "Electrodeposition of Porous Silicate Films from Ludox Colloidal Silica", Langmuir, 2003, vol. 19, pp. 7669-7672.

Deepa et al., "Electrochemically Deposited Sol-Gel-Derived Silicate Films as a Viable Alternative in Thin-Film Design", Anal. Chem., 2003, vol. 75, pp. 5399-5405.

Zhitomirsky, "Cathodic electrodeposition of ceramic and organoceramic materials. Fundamental aspects", Advances in Colloid and Interface Science, 2002, vol. 97, pp. 279-317.

* cited by examiner

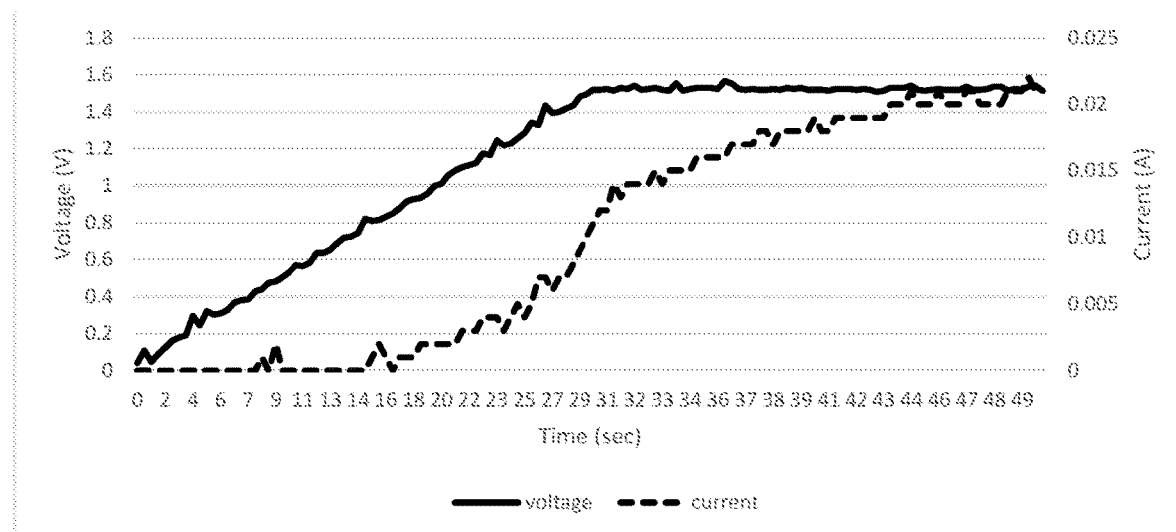

METHOD FOR PREPARING OPTICAL ARTICLES WITH MULTI-LAYER ANTIREFLECTIVE COATINGS

FIELD OF THE INVENTION

The present invention relates to methods for preparing optical articles, particularly optical articles demonstrating antireflective properties. The method provides optical articles comprised of substrates coated with multi-layer electrodeposited antireflective inorganic coatings.

BACKGROUND OF THE INVENTION

Various methods are known for reducing reflection and glare (i.e., bright specular reflection that is perceived by the eye) of optical article surfaces, for example, the surfaces of optical lenses and display screens. An exemplary method involves deposition of a light interference coating stack on the article surface that reduces reflection by exploiting optical interference within adjacent thin films. Such films typically have a thickness of about one-quarter or one-half the nominal wavelength of visible light, depending on the relative indices of refraction of the coating layers and the substrate. Another known method includes forming a light scattering means at the surface of the substrate, such as by mechanically or chemically altering the outermost surface of the substrate, or by using a diffuser coating or a glare-reducing filter.

Interference coatings can reduce reflection and glare without compromising resolution. However, such coatings are relatively expensive to deposit, requiring use of vacuum deposition techniques such as sputtering and precise manufacturing conditions, or very precise alkoxide deposition coating techniques with subsequent drying and firing steps.

Since typical antireflective coating stacks are comprised of multiple thin layers of alternating metal oxide films of varying refractive indices, film thickness uniformity is critical to achieving desired results. If film thickness uniformity is not strictly controlled, the differences in respective refractive indices of the thin films in the coating stack will result in interference patterns which usually are detected visually as colored or "rainbow" fringes or lines. Strict processing parameters must be maintained to obtain desired defect free results.

Thus, it would be desirable to provide an alternative low-cost and efficient method for applying an antireflective inorganic coating stack on an optical article surface which yields uniform thin film thicknesses while avoiding the significant drawbacks of the prior art.

SUMMARY OF THE INVENTION

The present invention is directed to a method for preparing a coated optical article comprising:
(a) providing a non-conductive substrate;
(b) forming at least one conductive coating layer over at least a portion of the substrate to form a conductive substrate;
(c) introducing the conductive substrate of (b) into a first electrodeposition bath containing a first electrodepositable coating composition under constant recirculation flow;
(d) electrodepositing a first electrodepositable coating composition over at least a portion of the conductive coating layer to form a first electrodeposited inorganic coating layer;
(e) introducing the coated substrate of (d) into at least a second electrodeposition bath containing a second electrodepositable coating composition under constant recirculation flow; and
(f) electrodepositing at least a second electrodepositable coating composition over at least a portion of the first electrodeposited inorganic coating layer to form at least a second electrodeposited inorganic coating layer thereover, thereby forming a multi-layer antireflective inorganic coating over the conductive coating layer.

Each of the first electrodepositable coating composition and the second electrodepositable coating composition is different one from the other. Each of the first electrodepositable coating composition and the second electrodepositable coating composition comprises at least one sol prepared from a composition comprising at least one metal oxide precursor and at least one protic acid such that each of the first electrodepositable coating composition and the second electrodepositable coating composition is hydrolyzed.

A coated optical article, such as a coated optical element, prepared by the aforementioned method also is provided.

BRIEF DESCRIPTION OF THE DRAWING

FIG. 1 depicts the plot of the measured voltage and current for a 50 second electrodeposition of $SiO_2$, with a 30 second voltage ramp to the final voltage set point of 1.5 volts.

DETAILED DESCRIPTION OF THE INVENTION

Other than in any operating examples, or where otherwise indicated, all numbers expressing quantities of ingredients, reaction conditions and so forth used in the specification and claims are to be understood as being modified in all instances by the term "about". Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

As used in this specification and the appended claims, the articles "a", "an", and "the" include plural referents unless expressly and unequivocally limited to one referent.

As used in this specification and the appended claims, the phrase "and/or" when used in a list is meant to encompass alternative embodiments including each individual component in the list as well as any combination of components.

For example, the list "A, B, and/or C" is intended to encompass seven separate embodiments that include A, or B, or C, or A+B, or A+C, or B+C, or A+B+C.

The various aspects and examples of the present invention as presented herein are each understood to be non-limiting with respect to the scope of the invention.

As mentioned above, the present invention is directed to a method for preparing a coated optical article comprising:
(a) providing a non-conductive substrate;
(b) forming at least one conductive coating layer over at least a portion of the substrate to form a conductive substrate;
(c) introducing the conductive substrate of (b) into a first electrodeposition bath containing a first electrodepositable coating composition under constant recirculation flow;
(d) electrodepositing a first electrodepositable coating composition over at least a portion of the conductive coating layer to form a first electrodeposited inorganic coating layer;
(e) introducing the coated substrate of (d) into at least a second electrodeposition bath containing a second electrodepositable coating composition under constant recirculation flow; and
(f) electrodepositing at least a second electrodepositable coating composition over at least a portion of the first electrodeposited inorganic coating layer to form at least a second electrodeposited inorganic coating layer thereover, thereby forming a multi-layer antireflective inorganic coating over the conductive coating layer.

Each of the first electrodepositable coating composition and the second electrodepositable coating composition(s) is different one from the other. Further, each of the first electrodepositable coating composition and the second electrodepositable coating composition(s) comprises at least one sol prepared from a composition comprising at least one metal oxide precursor and at least one protic acid such that each of the first electrodepositable coating composition and the second electrodepositable coating composition is hydrolyzed.

Optical Articles:

For purposes of the present invention, "optical articles" can include but are not limited to optical elements such as lenses, for example, piano and ophthalmic lenses, windows, mirrors, active or passive liquid crystal cell elements or devices, and display elements such as screens, including touch screens on devices, for example, cell phones, tablets, GPS, voting machines, point-of sale devices or computer screens, display sheets in a picture frame, monitors, wearable displays or security elements. Such articles may or may not include optical articles exhibiting one or more light-influencing properties such as tint, photochromic and/or polarization properties.

Non-Conductive Substrates:

As used herein, the term "non-conductive substrate" means an optical substrate that is not electrically conductive. Suitable optical substrates can include glass or any of the polymeric optical substrates known in the art, examples of which are described in detail herein below. Such optical substrates typically exhibit a light transmission value (i.e., transmits incident light) of at least 40 percent, such as at least 50 percent, or at least 70 percent, or at least 80 percent; and exhibit a haze value of less than 5 percent, such as less than 1 percent, or less than 0.5 percent as measured at 550 nanometers (nm) using, for example, Color i7 spectrophotometer from X-Rite, Inc. Further, the non-conductive substrates useful in the present invention can be transparent optical substrates. The term "transparent", as used in connection with the optical substrate, means that the indicated substrate, coating, film, and/or material has the property of transmitting light without appreciable scattering, with visible light transmittance higher than 70 percent, such as higher than 80 percent, or higher than 85 percent.

Suitable non-conductive glass optical substrates can include, but are not limited to, soda-lime-silica glass, such as soda-lime-silica slide glass sold from Fisher, or aluminosilicate glass such as Gorilla® glass from Corning Incorporated, or Dragontrail® glass from Asahi Glass Co., Ltd.

Suitable examples of non-conductive polymeric optical substrates can include, but are not limited to, polyol(allyl carbonate) monomers, e.g., poly(allyl diglycol carbonates) such as poly(diethylene glycol bis(allyl carbonate)), which is sold under the trademark CR-39® by PPG Industries, Inc.; polyurea-polyurethane (polyurea urethane) polymers, which are prepared, for example, by the reaction of a polyurethane prepolymer and a diamine curing agent, a composition for one such polymer being sold under the trademark TRIVEX® by PPG Industries, Inc.; polymers of polyol (meth)acryloyl terminated carbonate monomers; diethylene glycol dimethacrylate monomers; ethoxylated phenol methacrylate monomers; diisopropenyl benzene monomers; ethoxylated trimethylol propane triacrylate monomers; ethylene glycol bismethacrylate monomers; poly(ethylene glycol) bismethacrylate monomers; urethane acrylate monomers; poly(ethoxylated Bisphenol A dimethacrylate); poly (vinyl acetate); poly(vinyl alcohol); poly(vinyl chloride); poly(vinylidene chloride); polyethylene; polypropylene; polyurethanes; polythiourethanes; thermoplastic polycarbonates, such as the carbonate-linked resin derived from Bisphenol A and phosgene, one such material being sold under the trademark LEXAN®; polyesters, such as the material sold under the trademark MYLAR®; poly(ethylene terephthalate); polyvinyl butyral; poly(methyl methacrylate), such as the material sold under the trademark PLEXIGLAS®, and polymers prepared by reacting polyfunctional isocyanates with polythiols or polyepisulfide monomers, either homopolymerized or co- and/or terpolymerized with polythiols, polyisocyanates, polyisothiocyanates and optionally ethylenically unsaturated monomers or halogenated aromatic-containing vinyl monomers. Also suitable are copolymers of such monomers and blends of the previously described polymers and copolymers with other polymers, e.g., to form interpenetrating network products. Also suitable are substrates such as polyamide, cellulose triacetate (TAC), and cyclo-olefin polymer (COP).

For example, the non-conductive substrate can comprise an organic polymeric material selected from the group consisting of polycarbonate, polycyclic alkene, polyurethane, poly(urea)urethane, polythiourethane, polythio(urea) urethane, polyol(allyl carbonate), cellulose acetate, cellulose diacetate, cellulose triacetate, cellulose acetate propionate, cellulose acetate butyrate, poly(vinyl acetate), poly(vinyl alcohol), poly(vinyl chloride), poly(vinylidene chloride), poly(ethylene terephthalate), polyester, polysulfone, polyolefin, copolymers thereof, and mixtures thereof.

Conductive Coating Layer:

As previously mentioned, in the method of the present invention, at least one conductive coating layer is formed over at least a portion of the non-conductive substrate to provide a conductive substrate. The conductive coating layer typically is transparent and has a percent light transmittance of at least 70 percent, such as at least 75 percent, or at least 80 percent, or at least 85 percent. Further, the conductive coating layer has an electrical resistance (also referred to as "sheet resistance") of less than 1000 ohms/square, such as less than 500 ohms/square, or less than 100 ohms/square, or less than 50 ohms/square. For example, the conductive coating layer can have a percent light transmittance of at least 80 percent and an electrical resistance of less than 1000 ohms/square.

The conductive coating layer generally is an inorganic coating. Suitable inorganic coatings can include, but are not limited to, those comprising metal oxides, metal nitrides, metal oxynitrides, oxides or nitrides of metal alloys, doped oxides or nitrides or mixtures thereof. In specific reference to the conductive coating layer, the term "metal" is intended to include silicon and silicon alloyed with other metals. Non-limiting examples of suitable metal oxides can include oxides of titanium, hafnium, zirconium, niobium, zinc bismuth, lead, indium, tin, and mixtures thereof. These metal oxides can have small amounts of other materials such as, for example, manganese. Additionally, oxides or nitrides of metal alloys or metal mixtures can be used, such as oxides containing zinc and tin (e.g., zinc stannate), oxides of indium-tin alloys, silicon nitrides, silicon aluminum nitrides, oxynitrides or aluminum nitrides. Further, doped metal oxides or nitrides, such as antimony or indium doped tin oxides or nickel or boron doped silicon oxides can be used. The conductive coating layer can comprise at least one metal alloy oxide selected from the group consisting of oxides of titanium, hafnium, zirconium, niobium, zinc, bismuth, lead, indium, tin, zinc/tin alloy, and combinations thereof.

Further, in addition to or in lieu of the materials described immediately above, the conductive coating layer can comprise one or more conductive nanomaterials selected from the group consisting of carbon nanotubes, graphene, metal nanowires, and mixtures thereof.

It should be understood that the conductive coating layer can be formed from one or more coating layers. The conductive coating layer(s) can be applied to the non-conductive substrate by any conventional method known in the art. For example, the conductive coating layer(s) can be deposited by physical vapor deposition techniques, or by chemical vapor deposition techniques. Suitable deposition means can include, but are not limited to, spray pyrolysis, sol-gel, electron beam evaporation, or vacuum sputtering (e.g., magnetron sputter vapor deposition). Further, where applicable, any of the art recognized liquid coating application techniques can be employed. Suitable liquid coating application techniques can include, but are not limited to, dip-, spray-, curtain-, flow- and spin-coating techniques. Combinations of any of the aforementioned coating techniques can be used to apply the conductive coating layer(s).

The conductive coating layer can have an applied coating thickness ranging from 1 Angstrom to less than 25,000 Angstroms, such as 1 Angstrom to less than 20,000 Angstroms, or 1 Angstrom to less than 15,000 Angstroms, or 1 Angstrom to less than 10,000 Angstroms, or 1 Angstrom to less than 7500 Angstroms, or 1 Angstrom to less than 5000 Angstroms, or 1 Angstrom to less than 2000 Angstroms. For example, the conductive coating layer can have an applied coating thickness ranging from 5 Angstroms to 5000 Angstroms, or from 10 Angstroms to 2000 Angstroms.

Electrodepositable Coatings:

As previously mentioned, in the method of the present invention, a first electrodepositable coating composition is electrodeposited over at least a portion of the conductive coating layer to form a first electrodeposited inorganic coating layer thereover. Then, at least a second electrodepositable coating composition is electrodeposited over at least a portion of the first electrodeposited inorganic coating layer to form at least a second electrodeposited inorganic coating layer thereover. A multi-layer antireflective inorganic coating is thus formed over the conductive layer.

As used herein, in the specification and in the claims, "electrodeposit", "electrodeposition," and like terms are intended to include both electrolytic deposition and electrophoretic deposition. Electrolytic deposition describes production of material which is deposited from a solution containing its salts or complex(es) (i.e., ionic species) by passage of an electric current through the solution. For example, in cathodic electrolytic deposition, metal ions or complexes can be hydrolyzed by an electrogenerated base to form deposits of the metal on cathodic substrates. Electrophoretic deposition describes the production of a material from a suspension of particles of the material in a solvent. Charged particles suspended in a liquid medium migrate in an electric field and deposit on an electrode. The deposit formation is achieved via particle coagulation.

When ionic species or particles are positively charged, the deposition occurs on the negatively charged cathode and the process generally is referred to as cathodic electrodeposition. The deposition of negatively charged ionic species or particles on the positively charged anode generally is referred to as anodic electrodeposition.

The first electrodepositable coating composition and the second electrodepositable coating composition are different one from the other such that the refractive index of the first electrodeposited coating layer and the refractive index of the second electrodeposited coating layer are different one from the other.

Each of the first and second electrodepositable coating compositions comprises at least one sol prepared from a composition comprising at least one metal oxide precursor and at least one protic acid. The protic acid is present in each electrodepositable coating composition in an amount sufficient to ensure an acidic pH such that the sol present in the coating composition is hydrolyzed.

In the method of the present invention, one or both of the first electrodepositable coating composition and the second electrodepositable coating composition comprises a sol prepared from at least one, such as two or more, metal oxide precursor(s) selected from the group consisting of alkoxysilanes, metal oxyhalides, metal alkoxides, and mixtures thereof.

The metal oxide precursor can be selected from any of those having the following general formula (I):

$$M(R)_n(X)_m, \qquad (I)$$

where M is a metal, a transition metal or silicon; R is a non-hydrolyzable group, such as alkyl, aryl, amino, or alkylamino, each of which optionally is substituted with amino or thiol groups; X is a hydrolyzable group, such as alkoxy or oxyhalide; n+m=4; n is an integer from 0 to 3; and m is an integer from 1 to 4. Non-limiting examples of such metal oxide precursors can include tetraethoxysilane, tetraethyl orthosilicate, and zirconyloxychloride. Additionally, suitable metal oxide precursors can include alkoxides of aluminum, tin, antimony, zirconium, and/or titanium. Mixtures of any of the foregoing metal oxide precursors can be used. Non-limiting examples of suitable protic acids can include organic acids, inorganic acids or mixtures thereof. For example, protic acids suitable for use in the present invention can include, but are not limited to, acetic acid, formic acid, glutaric acid, maleic acid, nitric acid, hydrochloric acid, phosphoric acid, hydrofluoric acid, sulfuric acid or mixtures thereof.

The protic acid is present in each of the first electrodepositable coating composition and the second electrodepositable coating composition in an amount sufficient such that the pH of each of the first electrodepositable coating composition and the second electrodepositable coating composition ranges from 1.5 to 5.0, such as from 1.75 to 4.75, or from 2 to 4.

The first and/or second electrodepositable coating compositions can comprise water in an amount of at least 5 percent by weight, such as at least 25 percent by weight, or at least 50 percent by weight. The amount of water present in the first and/or second electrodepositable coating compositions can range from 5 percent to 95 percent, such as from 5 percent to 80 percent, or 5 percent to 75 percent, where percentages are based on weight.

The first and/or second electrodepositable coating compositions also can comprise a co-solvent, such as a glycol ether or lower alcohol, in addition to water. Suitable examples of glycol ethers can include, but are not limited to, propylene glycol methyl ether, propylene glycol methyl ether acetate, dipropylene glycol monomethyl ether and/or diethylene glycol monobutyl ether. Suitable examples of lower alcohols can include, but are not limited to, ethanol, n-propanol, isopropanol, n-butanol, isobutanol, and mixtures thereof. The co-solvent can comprise a mixture of one or more glycol ethers and one or more lower alcohols. The co-solvent can be present in the first and/or second electrodepositable coating compositions in an amount of at least 0.5 weight percent, such as at least 2 weight percent, or at least 5 weight percent. The amount of co-solvent present in the first and/or second electrodepositable coating compositions can range from 0.5 percent to 90 percent, such as from 1 percent to 70 percent, or 2 percent to 60 percent, or from 5 percent to 50 percent, where percentages are based on weight.

Each of the first electrodepositable coating composition and the second electrodepositable coating composition can comprise at least 5 percent by weight water and at least 0.5 percent by weight co-solvent. For example, each of the first electrodepositable coating composition and the second electrodepositable coating composition can comprise 5 to 95 percent by weight water and 0.5 to 90 percent by weight co-solvent.

Electrodeposition Process:

In the method of the present invention, once the conductive coating layer is formed on the non-conductive substrate, the conductive coating layer is contacted with a conductive element which is in electrical communication with a voltage source, and the substrate so configured is immersed in the first electrodepositable coating composition. In order for electrodeposition to occur, both the electrodepositable coating composition and the substrate must be conductive so as to support current flow at appropriate deposition voltages. The conductive coating layer serves as an electrode (i.e., a cathode or an anode) in an electrical circuit. Upon passage of an electric current between the charged conductive coating layer and a second electrode in contact with the electrodepositable coating composition, an adherent film is deposited upon the conductive coating layer.

In cathodic deposition (which is base catalyzed), hydroxyl ions are created on the conductive coating layer (which serves as the cathode) through electrolysis of water present in the first electrodepositable coating composition. This drives the condensation of the sol only upon the conductive coating layer (i.e., only at the cathode surface). While the method of the present invention is suited for either cathodic electrodeposition or anodic electrodeposition techniques, the method generally employs cathodic electrodeposition.

In the method of the present invention, once the conductive coating is applied to the non-conductive substrate, the substrate is introduced into a first electrodeposition bath containing a first electrodepositable coating composition. The first electrodepositable coating composition is under constant recirculation flow. That is, the electrodepositable coating composition is constantly recirculated throughout the bath container while maintaining a substantially uniform flow rate. For example, the composition can be introduced into the electrodeposition bath container through an inlet port and can exit the bath container through an outlet port, and be recirculated continuously during the coating process at a substantially uniform flow rate. This is to be distinguished over a conventional electrodeposition bath environment which is housed in an electrodeposition bath container under agitation using, for example, a paddle, blade or bar agitator which produces significant turbulence within the bath.

The first electrodepositable coating composition is electrodeposited over at least a portion of the conductive coating layer at a voltage ranging from 0.5 to 2.5 V., such as from 0.75 to 2.0 V., or from 1.0 to 1.75 V. for a period ranging from 15 to 90 seconds, such as from 20 to 80 seconds, or from 25 to 70 seconds.

After the first electrodepositable coating composition is electrodeposited over at least a portion of the conductive coating layer as described above, a first electrodeposited inorganic coating layer is formed thereover. The first electrodeposited inorganic coating layer has a film thickness ranging from 10 to 150 nanometers, such as from 15 to 125 nanometers, or from 20 to 100 nanometers. The film thickness is such that the first electrodeposited inorganic coating layer remains electrically conductive. The substrate thus coated is removed from the first electrodeposition bath.

Then the coated substrate is introduced into at least a second electrodeposition bath containing a second electrodepositable coating composition under constant recirculation flow, as described above in reference to the first electrodeposition bath.

The second electrodeposited inorganic coating layer is electrodeposited over at least a portion of the first electrodeposited inorganic coating layer (which is sufficiently electrically conductive) in a similar matter. The conductive first electrodeposited inorganic coating layer serves as an electrode in an electrical circuit. Upon passage of a current between the charged first electrodeposited inorganic coating layer and the second electrode in electrical contact with the second electrodepositable coating composition, an adherent second electrodeposited inorganic coating layer is formed over at least a portion of the first electrodeposited coating layer.

Referring to FIG. 1, the plot illustrates that the low film thicknesses of the respective electrodeposited inorganic coating layers can allow for multiple layer deposition without each layer becoming self-insulative. The plot illustrates the increase of current over the voltage range during a 50-second deposition of $SiO_2$ from a 0.2 M silica sol solution (the second electrodeposited layer) onto the previously applied $ZrO_2$ layer (the first electrodeposited layer). This deposition included a voltage ramp for the first 30 seconds of deposition. The plot illustrates that the film thickness of the first electrodeposited layer was low enough that it remained sufficiently conductive to facilitate deposition of the second electrodeposited layer.

Each of the first and second electrodepositable coating compositions are different one from the other and the resulting first and second electrodeposited inorganic coating layers have different refractive indices. That is, the respective refractive indices of the adjacent inorganic coating layers are different one from the other. A multi-layer antireflective inorganic coating thus is formed over the conductive layer on the optical substrate.

The second electrodepositable coating composition is electrodeposited over at least a portion of the first electrodeposited inorganic coating layer at a voltage ranging from 0.5 to 2.5 V., such as from 0.75 to 2.0 V., or from 1.0 to 1.75 V. for a period ranging from 15 to 90 seconds, such as from 20 to 80 seconds, or from 25 to 70 seconds.

After the second electrodepositable coating composition is electrodeposited over at least a portion of the first electrodeposited inorganic coating layer as described above, a second electrodeposited inorganic coating layer is formed thereover. The second electrodeposited inorganic coating layer has a film thickness ranging from 10 to 150 nanometers, such as from 15 to 125 nanometers, or from 20 to 100 nanometers.

It should be noted that the film thickness of the first electrodeposited inorganic coating layer and the second electrodeposited inorganic coating layer (or any subsequently applied electrodeposited coating layers) can be the same or different one from the other provided that the film thickness of each is within the stated ranges.

Additional electrodeposited inorganic coating layers can be formed over at least a portion of the second electrodeposited inorganic coating layer provided that each previously applied coating layer remains sufficiently conductive. Likewise, any electrodepositable coating compositions which are subsequently applied should be sufficiently different one from the other such that the respective refractive indices of adjacent coating layers are different one from the other.

The first electrodeposited inorganic coating layer can be dried prior to electrodeposition of the second electrodepositable coating composition. Likewise, the second electrodeposited inorganic coating layer can be dried after electrodeposition. Alternatively, the first and second electrodeposited inorganic coating layers can be dried simultaneously after electrodeposition of the second electrodepositable coating composition. For example, the first and/or second electrodeposited inorganic coating layers can be dried at a temperature ranging from ambient temperature to 200° C., for a period ranging from 30 seconds to 3 minutes.

The multi-layer antireflective inorganic coating prepared by the method of the present invention has a percent transmittance of greater than 80 percent, for example greater than 85 percent, such as greater than 90 percent. The method in accordance with the present invention can provide coated optical articles (such as any of those previously mentioned) having antireflective properties while maintaining excellent resolution and aesthetics.

Illustrating the invention are the following examples which, however, are not to be considered as limiting the invention to their details.

EXAMPLES

Two metal oxide sols were prepared by mixing together the components listed in the following Table 1. The weight percentage of each component used to prepare the two respective sol solutions used in the multi-layer electrodeposition were as listed. Each of the respective sol solutions was stirred for 30 minutes until clear.

TABLE 1

|  | 0.2M silica sol solution (wt. %) Electrodeposited Layer 2 | 5 mM Zirconia sol solution (wt. %) Electrodeposited Layer 1 |
| --- | --- | --- |
| TEOS* | 4 | — |
| $ZrOCl_2$ | — | 0.2 |
| 0.1M HCl in water | 3 | 5 |
| 0.2M KCl in water | 46.5 | 5 |
| Ethanol | 46.5 | 89.8 |

*tetraethyl orthosilicate

All components were obtained from Sigma-Aldrich.

Electrodeposition Cell Parameters:

A 1 mm thick stainless steel plate (purchased from McMaster Carr) was used as the anode in each electrodeposition cell. The plate was sanded and rinsed with ethanol before each use. The conductive transparent substrate used for the cathode was an indium tin oxide (ITO) coated glass slide (purchased from Delta Technologies). Both the anode and cathode were 2 inches×2 inches in size. The anode and cathode were placed 4 cm apart facing one another and connected to the rectifier using alligator clips. The electrodeposition bath was maintained at a temperature of 15° C.±5° C. and recirculated in a direction perpendicular to the anode and cathode using a peristaltic pump. The rectangular electrodeposition bath vessel used was 8.5 inches wide, 2.5 inches deep, and 2.5 inches in height. The inlet and outlet ports for the bath circulation were located on opposite sides of the vessel.

Electrodeposition of Multiple Metal Oxide Layers:

Step 1:

Application of Electrodeposition Layer 1:

During electrodeposition of Electrodeposition Layer 1, the ITO coated glass was placed in the 5 mM zirconia sol bath as the cathode and 1.5 Volts were applied to the cell for 60 seconds while the bath was continuously recirculated in the electrodeposition cell described above using a peristaltic pump. The sample was removed from the bath, rinsed with ethanol and heated for 2 minutes at 80° C.

Step 2:

Application of Electrodeposition Layer 2:

During electrodeposition of the Electrodeposition Layer 2, the electrocoated sample from Step 1 was placed into the 0.2 M silica sol bath as the cathode and 1.5 Volts were applied to the cell for 60 seconds while the bath was being continuously recirculated. This sample was removed from the bath, rinsed with ethanol and heated for 2 minutes at 80° C.

XPS depth analysis verified the presence of two discrete electrodeposited layers. A film thickness of 55 nanometers for the Electrodeposited Layer 1 of $ZrO_2$, and a film thickness of 100 nanometers for the Electrodeposited Layer 2 of $SiO_2$ were confirmed by XPS techniques.

The present invention can be further characterized by one or more of the following non-limiting clauses.

Clause 1. A method for preparing a coated optical article comprising:
(a) providing a non-conductive substrate;
(b) forming at least one conductive coating layer over at least a portion of the substrate to form a conductive substrate;
(c) introducing the conductive substrate of (b) into a first electrodeposition bath containing a first electrodepositable coating composition under constant recirculation flow;

(d) electrodepositing a first electrodepositable coating composition over at least a portion of the conductive coating layer to form a first electrodeposited inorganic coating layer;

(e) introducing the coated substrate of (d) into at least a second electrodeposition bath containing a second electrodepositable coating composition under constant recirculation flow; and (f) electrodepositing at least the second electrodepositable coating composition over at least a portion of the first electrodeposited inorganic coating layer to form at least a second electrodeposited inorganic coating layer thereover, thereby forming a multi-layer antireflective inorganic coating over the conductive coating layer, wherein each of the first electrodepositable coating composition and the second electrodepositable coating composition is different one from the other, and wherein each of the first electrodepositable coating composition and the second electrodepositable coating composition comprises at least one sol prepared from a composition comprising at least one metal oxide precursor and at least one protic acid such that each of the first electrodepositable coating composition and the second electrodepositable coating composition is hydrolyzed.

Clause 2. The method of clause 1, wherein the pH of each of the first electrodepositable coating composition and the second electrodepositable coating composition ranges from 1.5 to 5.0.

Clause 3. The method of clauses 1 or 2, wherein each of the first electrodepositable coating composition and the second electrodepositable coating composition comprises at least 5 percent by weight water and at least 0.5 percent by weight co-solvent.

Clause 4. The method of any of clauses 1 to 3, further comprising drying the first electrodeposited inorganic coating layer prior to electrodepositing the second electrodepositable coating composition thereover, and/or drying the second electrodeposited inorganic coating layer.

Clause 5. The method of any of clauses 1 to 4, wherein one or both of the first electrodeposited inorganic coating layer and the second electrodeposited inorganic coating layer are dried at a temperature ranging from ambient temperature to 200° C., for a period ranging from 30 seconds to 3 minutes.

Clause 6. The method of any of clauses 1 to 5, wherein one or both of the first electrodepositable coating composition and the second electrodepositable coating composition comprises a sol prepared from two or more metal oxide precursors.

Clause 7. The method of any of clauses 1 to 6, wherein the conductive coating layer is transparent.

Clause 8. The method of any of clauses 1 to 7, wherein the conductive coating layer has a percent light transmittance of at least 80 percent and an electrical resistance of less than 1000 ohms/sq.

Clause 9. The method of any of clauses 1 to 8, wherein the conductive coating layer comprises at least one metal alloy oxide selected from the group consisting of oxides of titanium, hafnium, zirconium, niobium, zinc, bismuth, lead, indium, tin, zinc/tin alloy, and combinations thereof.

Clause 10. The method of any of clauses 1 to 9, wherein the conductive coating layer comprises one or more conductive nanomaterials selected from the group consisting of carbon nanotubes, graphene, metal nanowires, and mixtures thereof.

Clause 11. The method of any of clauses 1 to 10, wherein the multi-layer antireflective inorganic coating has a percent transmittance of greater than 80 percent.

Clause 12. The method of any of clauses 1 to 11, wherein one or both of the first electrodepositable coating composition and the second electrodepositable coating composition comprises a sol prepared from at least one metal oxide precursor selected from the group consisting of alkoxysilanes, metal oxyhalides, metal alkoxides, and mixtures thereof.

Clause 13. The method of any of clauses 1 to 12, wherein the metal oxide precursor is selected from those having the following general formula (I):

$$M(R)_n(X)_m, \qquad (I)$$

where M is a metal, a transition metal or silicon; R is a non-hydrolyzable group; X is a hydrolyzable group, n+m=4; n is an integer from 0 to 3; and m is an integer from 1 to 4.

Clause 14. The method of clause 13, wherein R is alkyl, aryl, amino, or alkylamino, each of which optionally is substituted with amino or thiol groups; and X is alkoxy or oxyhalide.

Clause 15. The method of any of clauses 1 to 14, wherein the first electrodeposited inorganic coating layer and the second electrodeposited inorganic coating layer each independently has a film thickness ranging from 20 to 100 nanometers.

Clause 16. The method of any of clauses 1 to 15, wherein the first electrodepositable coating composition is electrodeposited over at least a portion of the conductive coating layer at a voltage ranging from 0.5 to 2.5 V. for a period ranging from 15 to 90 seconds.

Clause 17. The method of any of clauses 1 to 16, wherein the second electrodepositable coating composition is electrodeposited over at least a portion of the first electrodeposited coating layer at a voltage ranging from 0.5 to 2.5 V. for a period ranging from 15 to 90 seconds.

Clause 18. The method of any of clauses 1 to 17, wherein each of the first electrodeposited inorganic coating layer and the second electrodeposited inorganic coating layer has a refractive index different one from the other.

Clause 19. The method of any of clauses 1 to 18, wherein the non-conductive substrate comprises an organic polymeric material selected from the group consisting of polycarbonate, polycyclic alkene, polyurethane, poly(urea)urethane, polythiourethane, polythio(urea)urethane, polyol (allyl carbonate), cellulose acetate, cellulose diacetate, cellulose triacetate, cellulose acetate propionate, cellulose acetate butyrate, poly(vinyl acetate), poly(vinyl alcohol), poly(vinyl chloride), poly(vinylidene chloride), poly(ethylene terephthalate), polyester, polysulfone, polyolefin, copolymers thereof, and mixtures thereof.

Clause 20. A coated optical article prepared by the method of any of clauses 1 to 19.

Clause 21. The coated optical article of clause 20, wherein the coated optical article is a coated optical element.

While specific embodiments of the present invention have been described in detail, it will be appreciated by those skilled in the art that various modifications and alternatives to those details could be developed in light of the overall teachings of the disclosure. Accordingly, the particular embodiments disclosed herein are intended to be illustrative only and not limiting as to the scope of the invention which is to be given the full breadth of the claims appended and any and all equivalents thereof.

Therefore, we claim:

1. A method for preparing a coated optical article comprising:
   (a) providing a non-conductive substrate;
   (b) forming at least one conductive coating layer over at least a portion of the substrate to form a conductive substrate;
   (c) introducing the conductive substrate of (b) into a first electrodeposition bath containing a first electrodepositable coating composition under constant recirculation flow at a substantially uniform flow rate;
   (d) electrodepositing the first electrodepositable coating composition over at least a portion of the conductive coating layer to form a first electrodeposited inorganic coating layer;
   (e) introducing the coated substrate of (d) into at least a second electrodeposition bath containing a second electrodepositable coating composition under constant recirculation flow at a substantially uniform flow rate; and
   (f) electrodepositing at least the second electrodepositable coating composition over at least a portion of the first electrodeposited inorganic coating layer to form at least a second electrodeposited inorganic coating layer thereover, thereby forming a multi-layer antireflective inorganic coating over the conductive coating layer,
   wherein each of the first electrodepositable coating composition and the second electrodepositable coating composition is different one from the other, and
   wherein each of the first electrodepositable coating composition and the second electrodepositable coating composition comprises at least one sol prepared from a composition comprising at least one metal oxide precursor and at least one protic acid such that each of the first electrodepositable coating composition and the second electrodepositable coating composition is hydrolyzed.

2. The method of claim 1, wherein the pH of each of the first electrodepositable coating composition and the second electrodepositable coating composition ranges from 1.5 to 5.0.

3. The method of claim 2, wherein each of the first electrodepositable coating composition and the second electrodepositable coating composition comprises at least 5 percent by weight water and at least 0.5 percent by weight co-solvent.

4. The method of claim 1, further comprising drying the first electrodeposited inorganic coating layer prior to electrodepositing the second electrodepositable coating composition thereover, and/or drying the second electrodeposited inorganic coating layer.

5. The method of claim 4, wherein one or both of the first electrodeposited inorganic coating layer and the second electrodeposited inorganic coating layer are dried at a temperature ranging from ambient temperature to 200° C., for a period ranging from 30 seconds to 3 minutes.

6. The method of claim 1, wherein one or both of the first electrodepositable coating composition and the second electrodepositable coating composition comprises a sol prepared from two or more metal oxide precursors.

7. The method of claim 1, wherein the conductive coating layer is transparent.

8. The method of claim 7, wherein the conductive coating layer has a percent light transmittance of at least 80 percent and an electrical resistance of less than 1000 ohms/sq.

9. The method of claim 1, wherein the conductive coating layer comprises at least one metal oxide selected from the group consisting of oxides of titanium, hafnium, zirconium, niobium, zinc, bismuth, lead, indium, tin, zinc/tin alloy, and combinations thereof.

10. The method of claim 1, wherein the conductive coating layer comprises one or more conductive nanomaterials selected from the group consisting of carbon nanotubes, graphene, metal nanowires, and mixtures thereof.

11. The method of claim 1, wherein the multi-layer antireflective inorganic coating has a percent transmittance of greater than 80 percent.

12. The method of claim 1, wherein the at least one metal oxide precursor from which the at least one sol is prepared is selected from the group consisting of alkoxysilanes, metal oxyhalides, metal alkoxides, and mixtures thereof.

13. The method of claim 12, wherein the metal oxide precursor is selected from those having the following general formula (I):

$$M(R)_n(X)_m, \quad (I)$$

where M is a metal, a transition metal or silicon; R is a non-hydrolyzable group; X is a hydrolyzable group, n+m=4; n is an integer from 0 to 3; and m is an integer from 1 to 4.

14. The method of claim 13, wherein R is alkyl, aryl, amino, or alkylamino, each of which optionally is substituted with amino or thiol groups; and X is alkoxy or oxyhalide.

15. The method of claim 1, wherein the first electrodeposited inorganic coating layer and the second electrodeposited inorganic coating layer each independently has a film thickness ranging from 20 to 100 nanometers.

16. The method of claim 1, wherein the first electrodepositable coating composition is electrodeposited over at least a portion of the conductive coating layer at a voltage ranging from 0.5 to 2.5 V. for a period ranging from 15 to 90 seconds.

17. The method of claim 16, wherein the second electrodepositable coating composition is electrodeposited over at least a portion of the first electrodeposited coating layer at a voltage ranging from 0.5 to 2.5 V. for a period ranging from 15 to 90 seconds.

18. The method of claim 1, wherein each of the first electrodeposited inorganic coating layer and the second electrodeposited inorganic coating layer has a refractive index different one from the other.

19. The method of claim 1, wherein the non-conductive substrate comprises an organic polymeric material selected from the group consisting of polycarbonate, polycyclic alkene, polyurethane, poly(urea)urethane, polythiourethane, polythio(urea)urethane, polyol(allyl carbonate), cellulose acetate, cellulose diacetate, cellulose triacetate, cellulose acetate propionate, cellulose acetate butyrate, poly(vinyl acetate), poly(vinyl alcohol), poly(vinyl chloride), poly(vinylidene chloride), poly(ethylene terephthalate), polyester, polysulfone, polyolefin, copolymers thereof, and mixtures thereof.

* * * * *